Figure 1:
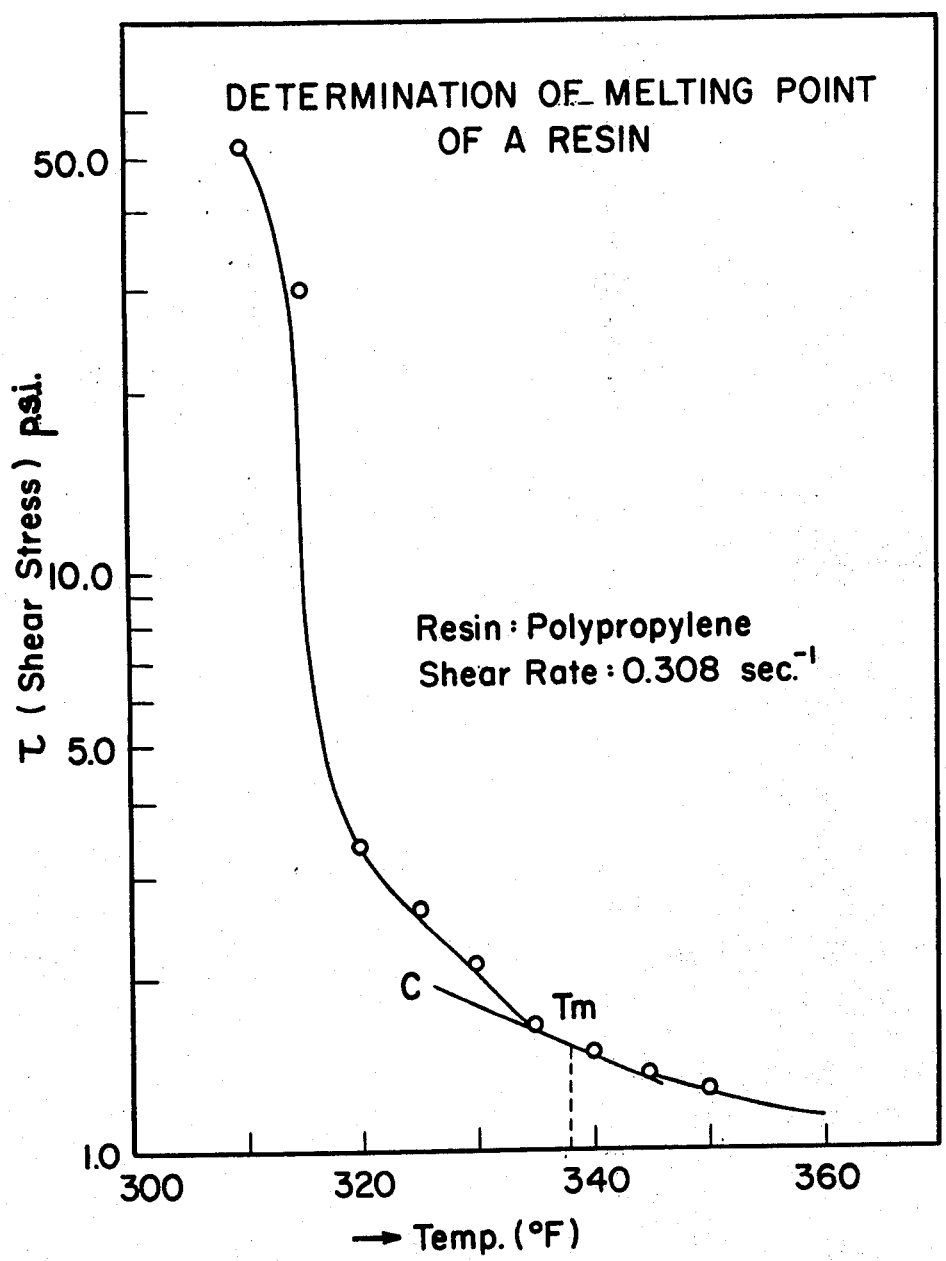

United States Patent [19]

Shichman et al.

[11] 3,965,055

[45] June 22, 1976

[54] FREE CURING RUBBER COMPOSITION

[75] Inventors: Daniel Shichman, Trumbull; Sung Whee Hong, Cheshire, both of Conn.

[73] Assignee: Uniroyal Inc., New York, N.Y.

[22] Filed: Feb. 14, 1974

[21] Appl. No.: 442,519

Related U.S. Application Data

[60] Continuation-in-part of Ser. No. 290,909, Sept. 21, 1972, abandoned, which is a division of Ser. No. 66,753, Aug. 25, 1970, Pat. No. 3,701,702.

[52] U.S. Cl. ................................. 260/3; 156/244; 260/4 R; 260/23.7 M; 260/857 D; 260/873; 260/889; 260/897 A; 260/897 B; 264/25; 264/175; 264/176 F; 264/236
[51] Int. Cl.² ...................... B29C 25/00; C08L 7/00
[58] Field of Search .................. 260/3, 4 R, 5, 873, 260/889, 857

[56] References Cited
UNITED STATES PATENTS

| | | | |
|---|---|---|---|
| 3,421,766 | 1/1969 | Chmiel et al. | 260/889 |
| 3,432,165 | 3/1969 | Haines et al. | 260/889 |
| 3,452,120 | 6/1969 | Arnold | 260/889 |
| 3,746,669 | 7/1973 | Dunnom et al. | 260/3 |

*Primary Examiner*—John C. Bleutge
*Attorney, Agent, or Firm*—Thomas A. Beck

[57] ABSTRACT

A vulcanizable rubber is modified by the addition of a resin at a temperature above the melting point of said resin. Shaped articles are formed from the resulting blend and cured without restraining pressure at a temperature below the melting point of said resin. The resin portion is present in said articles in the form of particles having a cross sectional dimension (D) not greater than ½ micron and a length (L) to cross sectional dimension (D) ratio of 2 or greater.

5 Claims, 3 Drawing Figures

FREE CURING RUBBER COMPOSITION

This application is a continuation-in-part of U.S. application Ser. No. 290,909, filed Sept. 21, 1972, now abandoned which is a Divisional Application of Ser. No. 66,753 filed Aug. 25, 1970, now U.S. Pat. No. 3,701,702.

BACKGROUND OF THE INVENTION

1. Field of the Invention

The invention relates to preparation of a free cured vulcanizate comprising a modified elastomeric composition. More specifically, the invention relates to a vulcanizate prepared from a rubber-resin blend wherein the resin particles which are dispersed in the rubber have a certain shape with the result that the necessity for restraining pressure to prevent blowing during the cure cycle of an article shaped from said blend is eliminated.

2. Description of the Prior Art

Presently, the blowing of rubber articles during or after cure (the terms "cure", "vulcanize" and variations thereof are used herein interchangeably) is prevented by the application of restraining pressure on the article being cured through the use of platens, mold forms or other suitable restraining means. The blowing phenomenon occurs because one or more of the organic or inorganic compounds which are purposely or inadvertently compounded into rubber vaporize or expand when heated during the curing step of the fabrication process. As a result the structure of the rubber is altered from a continuous solid to a cellular or spongy state.

Temperature and pressure are two important parameters when considering the vulcanization of any given rubber product. Because it is economically advantageous to have the fastest possible cures of rubber products when the product is held under restraining pressure, the temperature chosen is usually the highest possible temperature consistent with the production of goods of satisfactory quality.

However, when rubber products are cured without pressure, or at a relatively low pressure, it has been determined that the maximum temperature which can be employed in the curing step is limited by the tendency of most rubbers to blow during the cure, resulting in an undesirable porous article. The need for restraining pressure on the rubber product during the curing cycle frequently necessitates the addition of a separate step to the process as well as adding substantial expense to the overall cost of the product since curing equipment capable of exerting restraining pressure must be provided.

Among others, two ways in which the prior art sought to eliminate the blowing during cure are: (1) to remove the substances which would vaporize (i.e. the volatiles) in the rubber, or (2) to use rubbers possessing high green strength.

To remove the volatiles contained in a compounded rubber, the rubber product is heated to a relatively low temperature in a dry vacuum prior to the curing step. This method also necessitates additional costly equipment on the production line and is time-consuming.

The use of rubbers possessing high green strength eliminates the blowing phenomenon during the curing cycle because the uncured rubber composition has the inherent strength to withstand the bubble formation and expansion which generally results from the formation of entrapped gases, thus keeping them in solution in the rubber. The major drawbacks in this approach are that only a limited number of rubber polymers possess the necessary internal strength to withstand blowing, and further, the modulus of these rubber polymers is such that their commercial uses are somewhat limited.

DESCRIPTION OF THE INVENTION

The vulcanizate of the present invention is obtained by adding to natural rubbers, synthetic rubbers or blends thereof, between about 2 and 30% (based on total weight of the composition) of a fiber-forming, semi-crystalline, thermoplastic resin, said resin being dispersed in said rubbers noted above in the form of particles having a cross sectional dimension not greater than one-half micron and a L/D (length to cross sectional dimension) ratio of 2 or greater. The blend is formed into an article and cured at a temperature above 220°F. and at a pressure below the water vapor pressure for the curing temperature. The density of said cured article is not decreased by more than 3% of the density of the uncured rubber blend. The process for making the vulcanizate of the present invention comprises the following steps:

A. Initially, the rubber and resin in the amounts indicated above, along with pigments, fillers, antioxidants if desired, etc. forming the composition are blended in suitable mixing means, such as an internal shear (Banbury) mixer of a mixing mill, which is maintained at a temperature above the melting point of the thermoplastic resin. The high temperature during this blending step insures a substantially homogeneous dispersion of the resin and additives in the rubber.

Alternatively, another convenient way to blend the rubber-resin composition is to prepare a masterbatch by blending rubber and resin at a ratio of from between about 1:1 to 3:1 respectively, at a temperature above the melting point of the resin, and subsequently blend the proper amount of the resultant masterbatch into the unmodified rubber at a temperature near the melting point of the resin to result in a composition containing between about 2 and 30% resin, based upon total weight of composition.

B. After blending by either method described above, the rubber-resin mixture is cooled to a temperature below the melting point of the resin, for example, to about room temperature, whereupon; compositions C. the blend is placed on a second mill which is maintained at a temperature low enough to prevent scorch, (e.g., about 200°F.) and the active chemicals such as curatives, activators, antioxidants, accelerators, etc., are added to the blend and incorporated therein.

D. The resultant blend is formed into a shaped article using such fabrication methods as molding, calendering, laminating, extruding or any combination thereof at a temperature below the melting point of the thermoplastic resin.

E. The shaped article is then free cured at a temperature below the melting point of the thermoplastic resin component in the blend and generally above 220°F. It is essential that the temperature of the blend at the shaping and curing stages of the process be below the melting point of the thermoplastic resin contained therein.

The advantages resulting from the use of the present invention are that:

1. The rubber material is easier to feed to the extruders.

2. Blowing of the rubber during the curing cycle is eliminated as a processing problem, and consequently it is not necessary to cure the shaped rubber article under pressure in a mold.

3. Present or shorter press cycles for forming can be obtained at lower temperatures with a free cure being completed at atmospheric pressure outside of the mold. The expression "free cure" as used herein means the curing of a shaped rubber article in a fluid medium at atmospheric pressure with little or no restraining means being used to prevent blowing during the cure. If pressure is utilized for any reason during the cure cycle in the practice of the present invention, such pressure shall be substantially below (e.g., ½) the water vapor pressure of the curing temperature, and the use of the aforesaid amount of pressure or less, shall be considered within the scope of the present invention as a free cure.

4. The rubber possesses better flow properties as a result of the use of lower levels of accelerators thus eliminating scorching. (Scorching is a partial cure of rubber before it has been shaped to the desired form. Scorching is attributable to the use of high levels of accelerators in the rubber recipe in order to shorten the cure cycle time. The use of high levels of accelerators increases the possibility that some vulcanization will occur during the blending and forming operations prior to use).

The vulcanizable materials (i.e., rubbers capable of crosslinking) which are modified in accordance with the present invention are the unsaturated hydrocarbon polymers exemplified by the diene polymers (which may be halogenated), such as polybutadiene, polychloroprene or polyisoprene, especially polybutadiene or polyisoprene having a high content of cis-polymer or a low content of cis-polymer; copolymer rubbers such as butyl rubber (i.e., copolymers based on isomonoolefins such as isobutylene and a small amount [e.g. 0.25 to 10%] of a conjugated diene such as isoprene), and even natural polymers such as balata, Hevea rubber, and the like. Also, depolymerized rubber may be used. Other unsaturated hydrocarbon polymers that may be mentioned are the rubbery interpolymers of at least two alpha-monoolefins (e.g., ethylene, propylene, butene-1, hexene-1, 4-methylpentene-1, 5-methylhexene-1, 4-ethylhexene-1, or similar olefins having the formula $CH_2 = CHR$, in which R is hydrogen or a hydrocarbon radical, particularly a saturated alkyl hydrocarbon radical having from 1 to 8 carbon atoms) and at least one copolymerizable diene such as dicyclopentadiene, methylcyclopentadiene dimer, 1,4-hexadiene, 11-ethyl-1, 11-tridecadiene, 1,9-octadecadiene, 1,5-cyclooctadiene, methylene norbornene, ethylidene norbornene or other suitable dienes (such rubbers are referred to hereinafter as "EPDM") such as are disclosed in British Pat. No. 880,904 of Dunlop Rubber Co., Oct. 25, 1961, U.S. Pat. Nos. 2,933,480, Gresham and Hunt, Apr. 19, 1960, and 3,000,866, Tarney, Sept. 19, 1961 and Belgian Pat. Nos. 623,698 and 623,741 of Montecatini, Feb. 14, 1963; preferred are terpolymers of this kind containing from about 1 to about 25% (more preferably about 2 to about 15%) by weight of dicyclopentadiene or the like. In fact, the invention can be practiced with rubbers prepared by methods other than solution polymerization, for example by emulsion polymerization, e.g., emulsion polymerized diene homopolymers or copolymers including butadiene-styrene copolymer or copolymers with other copolymerizable monomers such as acrylonitrile, vinylpyridine, ethyl acrylate and the like.

The fiber-forming semi-crystalline thermoplastic resins which are added to the rubbers noted above in accordance with the present invention, possess a melting point of about 250°F. or greater.

In order to be effective as a "no blow" additive the resin utilized in the present invention is dispersed in the vulcanizable material in the form of particles having a cross sectional dimension (D) not greater than one-half micron and a length (L) to cross sectional dimension (D) ratio of 2 or greater. Unless the resin is dispersed in the vulcanizable material in the form of particles having the size limitations set forth above, it is not possible to obtain free cured shaped articles which are of commercial quality.

The thermoplastic resin which is used in the present invention can vary so long as the rheological properties are such that the shear level of mixing in the Banbury or on the mill is sufficient to bring the temperature of the blend above the melting point of the resin. Also, it is desirable that the resin possess a softening temperature which permits cold remill of the blend wherein the active chemicals e.g., curatives, accelerators, etc., are incorporated into the rubber-resin blend without softening the resin, and which permits a cure of the rubber in a reasonable amount of time without completely melting the resin.

For the purpose of this specification "melting point of the resin" means the temperature at which the resin is completely melted. This point varies among the different resins included within the scope of the present invention, and can vary among the same resins because these resins possess widely varying ranges of molecular weight distribution. In order to determine the temperature at which the resin undergoes complete melting, a graph of the curve which represents shear stress as a function of temperature is obtained using a biconical rheometer.

Using the formula $$\frac{\delta \tau}{\delta T}\bigg|_{T=Tm} = C$$

where $\tau$ is shear stress, T is temperature, Tm is melting point of the resin and C is the slope of the curve, the melting point of the resin (Tm) is the temperature value (T) of the shear stress-temperature curve of any thermoplastic resin where the slope (C) becomes more than $-0.02$, and the value of shear stress ($\tau$) is less than 5 psi, at a shear rate of 0.31 sec.$^{-1}$. For example, the shear stress vs. temperature curve of polypropylene is shown in FIG. 1. The slope of the curve at the point where the resin is completely melted is:

$$\frac{\delta \tau}{\delta T}\bigg|_{T=338°} = -.02 \text{ P.S.I./°F.}$$

at a shear rate of 0.308 sec.$^{-1}$.

Each rubber-resin blend used in the present invention possesses a different shear stress level at a constant shear stress It has been noted that the shear stres value ($\tau$) is less than 5 psi.

Using the conditions and values noted above, blends of varying amounts of polypropylene and the copolymer of ethylene (83% by wgt.) and methacrylic acid (17% by wgt.) which has been 57% neutralized with sodium ions, (referred to as ionomer) were evaluated to determine the melting points. The blends were:

|  | Slope C. P.S.I./°F. | Melting Point °F. |
|---|---|---|
| ( 75% Polypropylene (6723) ) ( 25% Ionomer (1555) ) | −0.02 | 338 |
| ( 85% Polypropylene (6723) ) ( 15% Ionomer (1555) ) | −0.02 | 335 |
| ( 95% Polypropylene (6723) ) ( 5% Ionomer (1555) ) | −0.02 | 332 |

As the amount of ionomer present in the blend is decreased, the melting of the resin blend decreases. This illustrates the application of the formula in determining the melting point of a typical resin system of varying compositions.

Some examples of useful resin polymers are:

A. Polyolefins having three (3) to six (6) carbon atoms in the repeating unit such as polypropylene, poly (butene-1), poly (4-methylpentene-1), etc.

B. Polyamides which are present either as a homopolymer or a copolymer in which the amido group is an integral part of the polymer chain (i.e., an intra-linear polyamide), or as a homopolymer or copolymer having pendant groups containing or consisting of amido groups (i.e., an extra-linear polyamide).

Illustrative of intra-linear polyamides useful in this invention are homopolyamides such as poly (hexamethylene adipamide) (Nylon 66), poly (hexamethylene sebacamide) (Nylon 610), polypyrrolidonone, polycaprolactam (Nylon 6), polyenantholactam and copolyamides such as Zytel 61 (DuPont), an interpolymer of hexamethylene adipamide and hexamethylene sebacamide with caprolactam.

Examples of extra-linear polyamides are the poly (vinylpyrrolidonones) and polyacrylamides. Other examples of extra-linear polyamides are copolymers of amido-group-containing vinyl monomers with other olefinic monomers such as acrylic and methacrylic esters typified by ethyl acrylate and methyl methacrylate, vinylaryl hydrocarbons typified by styrene and vinyltoluenes, and butadiene-1,3. Still further examples are graft copolymers of a previously formed linear high polymer, such as polyethylene, polypropylene, polystyrene, and polybutadiene, with a vinylpyrrolidonone or an acrylamide.

C. Also included are polyester resins which include condensation polymers or dihydric alcohols with organo-dibasic acids, particularly dicarboxylic acids, and self-condensation polymers of omega-hydroxy carboxylic acids. It should be understood that the invention is applicable to all film and fiber-forming polyesters, in which the ester linkages are intralinear, including poly (alkylene alkanedioates), poly(cycloalkylenedimethylene alkanedioates), poly(alkylene arenedioates), poly(cycloalkylenedimethylene arenedioates), and analogous materials. Examples of some of the above-named types of polyesters are poly(ethylene adipate), poly(1,4-cyclohexylenedimethylene adipate), poly(ethylene terephithalate), poly(ethylene isophthalate), poly(co-ethylene terephthalate-isophthalate) and poly(1,4-cyclohexylenedimethylene terephthalate).

D. Other useful polymers are the ionomers which are ionic copolymers prepared by neutralizing with metal ions at least 10% of the acid groups of a copolymer of units derived from an α-olefin of the formula $CHR=CH_2$ wherein R is H or an alkyl group having from 1 to 8 carbon atoms, and from 1.0 to 25 mole percent of units derived from an $\alpha,\beta$-ethylenically unsaturated carboxylic acid. "Derived" means that the polymer units are obtained by copolymerization of the monomers named.

The ionomer is made by copolymerizing the α-olefin and carboxylic acid, described hereinbefore to form a copolymer in which the acid derived units are randomly distributed along the copolymer chain. The resultant acid copolymer is intimately contacted with a basic compound containing the particular metal ion desired, to obtain the amount of neutralization desired. The preferred range of neutralization is from 10 to 100% by wt. of the acid groups present. "Neutralization" and variations of this work mean reacting the metal ion with the acid groups of the copolymer to obtain the ionic copolymer. Useful metal ions include those having a valence of 1 to 3 inclusive, and particularly those of Groups I (a and b) and II (a and b) and the transition elements of the Periodic Table. Because of the possibility of polyvalent metal ions forming basic salts, as much as 150% of the amount of such metal ion theoretically required for neutralization can be used. The preferred mole percent of mono- or dicarboxylic acid derived units is from 3 to 15 mole percent. Examples of olefins include ethylene, propylene, butene-1, and hexene-1. Examples of the acids include acrylic, methacrylic acids and maleic and fumaric acids and monoalkyl esters and anhydrides thereof.

E. Acrylic polymers may also be used. This material is made from a copolymer composed of at least 85% acrylonitrile and 15% or less of such comonomers as vinyl acetate, acrylic esters and vinyl pyrrolidone. Other useful acrylic materials are the modacrylics containing 35–85% acrylonitrile and usually 20% or more vinyl chloride or vinylidene chloride; and the nytril composition, one example of which is a 1:1 alternating copolymer of vinylidene cyanide and vinyl acetate. A preferred acrylic resin is polyacrylonitrile.

Generally, between about 2 and 30 percent, preferably between 2 and 10 percent (based on the total weight of composition) of the thermoplastic resin is added to the rubber in the form of particles having (D) not greater than ½ micron and L/D of 2 or greater.

Depending upon the resin, in some instances the melt temperatures of the mill are actually too high to properly melt the resin and allow for its uniform incorporation into the rubber, and in such cases the masterbatch technique referred to previously can be utilized with rubber-resin ratio of 1:1–3:1.

The combination of polypropylene and between about 5 and 20% of an ionomer as described (based upon the amount of polypropylene present in the blend) provides an unusually useful additive to be blended into the rubber. This combination results in easier processing of the rubber-resin blend and improves the physical properties of the vulcanizate made from said blend.

U.S. Pat. No. 3,123,583, discloses a rubber-resin blend possessing from 0.5 to 99.5 parts polyethylene resin per 100 parts of the blend. The blending of rubber and resin is performed at a temperature of 270°F. (above the melting point of the resin) and subsequently the blend is cold milled at a temperature below 150°F., preferably 130°F. The distinction between the reference cited and the present invention is that the reference discloses curing the rubber well above the melting point of the resin, whereas in the present invention it is essential that the rubber be shaped and cured at a temperature below the melting point of the thermoplastic resin additive. If the rubber-resin blend of the present invention is shaped and cured at a temperature above the melting point of the resin additive, the blowing phenomemon is not eliminated.

Initially, the rubber-resin blends of the present invention are blended at a temperature above the melting point of the resin in any convenient mixing device which enables: (1) the attainment of a uniform blend, (2) the attainment of adequate dispersion of pigments, (i.e., avoidance of lumps and agglomerates of the pigments), and (3) production of consecutive batches which are uniform both in degree of dispersion and viscosity. Suitable mixers are roll mills or internal shear mixers such as a Banbury, Intermix or Bolling mixer.

After blending, the rubber-resin blend is then cooled and curatives are added to the blend. Any of the well known sulfur containing curative compounds, as well as non-sulfur containing curative compounds including oxidizing agents, (such as selenium, tellurium, organic peroxides, nitro compounds, and the like) may be used. Preferred compounds to be used are sulfur and/or sulfur donating compounds such as N-t-butyl-2-benzothiazole sulfenamide, dipentamethylene thiuram hexasulfide and the organic peroxides such as dicumyl peroxide. Other suitable compounds are dinitrosobenzene, quinone dioxime, and dimethylolphenols. All of these curatives are added in amounts of between about 1 and 15 parts per 100 parts of rubber.

Other modifying or compounding ingredients may be incorporated into the mixture of rubber and resin if desired. Thus, fillers such as carbon black, clays, hydrate silica, whiting, or the like, may be present, as well as pigments and dyes, mold release agents, softeners or plasticizers, tackifying agents, accelerators, etc.

The rubber-resin stock is formed into a shaped article after the two blending steps and prior to vulcanization. The methods which can be used to form the shaped article are extrusion, calendering, molding and laminating operations or any desired combination thereof.

After the stock has been formed into a shaped article, it is ready for a "free cure".

The desired level of cure may range all the way from a slight precure (as disclosed, for example, in U.S. Pat. Nos. 2,702,286, 2,702,287 and 2,756,801) to a complete vulcanization. The slight pre-cure may be carried out for various purposes, such as to improve processing, to improve the dispersion of carbon black, silica and other fillers in the rubber, to lower the hysteresis of such rubber-resin mixtures (when subsequently vulcanized) to render the rubber more compatible with oil or with other rubbers, to provide a plastic puncture-sealing material for pneumatic tires or tubes, or to provide shorter curing time.

It will be understood that such slight pre-cure, is accomplished by heating the mixture of rubber-resin and curing agent, along with any other desired ingredients, to a temperature sufficient to cause a slight vulcanization. Temperatures below the melting point of the resin must be used. Curing of the article may require only from 2 to 15 minutes if a pre-cure treatment is used and up 8 hours without any pre-cure treatment, depending on such variables, as the type of treating medium and the temperature of the treatment. Subsequently, a pre-cured article may be completely cured if desired.

It has been found to be very advantageous to preheat the stock or article by high frequency heating, e.g., micro-wave or dielectric heating, prior to the actual curing step since this type of preheating enables shorter curing times and hence manufacturing costs to be reduced considerably. Dielectric heating is a method of inducing heat by a means of an electromagnetic field of sufficient frequency and intensity to cause molecular stress and friction within the article being heated. Micro-wave heating is similar to dielectric heating but uses frequencies in the $10^9$ to $10^{10}$ cps range. For simple shapes, the high frequency heating permits fast and substantially even heating of the rubber stock or shaped article when it is placed in the electromagnetic high frequency field.

Depending upon the temperature achieved in the article, the use of high frequency preheating can virtually eliminate the induction time associated with the standard cure. Thus preheating to a higher temperature substantially reduces the time it takes to cure the article. (See FIG. 3 herein)

The stocks can be made more sensitive to high frequency heating by selectively utilizing fillers (e.g., special types of carbon black), rubbers, resins and cure systems to obtain the desired result.

One advantage obtained when preheating the rubber-resin stock of the present invention using a high frequency field is that the temperature at which the rubber-resin stock blows is substantially raised as compared with the blow temperature of an unmodified rubber, i.e., one which does not contain the thermoplastic resins described herein.

Through the use of the substantially complete free cure of the rubber according to the present invention strong, elastic, and resilient cured articles such as curing bags, steam hose, conveyor belts, pneumatic tires, rubber mountings, fuel cells, protective clothing, and similar articles may be obtained. The vulcanization step consists of heating the stock or shaped article to the proper cure temperature for the required length of time. The time required to substantially complete the cure will vary widely in practice depending on such variables as the quantity of the curing agents employed, the temperature at which the process is carried out, the size of the article being cured, the type of apparatus employed, the extent of preheating, etc. In general, it may be stated that satisfactory cures may be obtained within curing times ranging between about 2 minutes to 8 hours. It will be understood that the time required will in general be inversely related to the quantity of the vulcanizing agent contained in the mixture, and will also be inversely related to the temperature existing during the cure. Any of the standard methods of vulcanization may be used such as mold curing, injection curing, steam curing, hydraulic curing, air curing, etc. Combinations of the aforesaid methods may also be utilized. For example, the stock may be heated and/or partially free cured in air and completed in the mold, or partially cured in the mold and free cured in air with or without additional heat to complete the cure. In standard molding practice, curing pressures at or above the water vapor pressure for the given curing temperature are used. As noted previously, the present invention allows a marked decrease in the required curing pressure at curing temperatures above 220°F. When fabricating an article having component parts using a calendering, molding, extrusion operation, etc., it is necessary to achieve intimate contact between said parts by applying pressure thereto. This application of pressure is known as consolidation.

The following examples, in which all parts and percentages are by weight, will serve to illustrate the practice of the invention in more detail.

EXAMPLE I

Two masterbatch compositions described in Tables 1 and 2 were mixed (separately) in a Banbury mixer.

The ingredients of Stock 1 were added to the Banbury and mixed until the temperature of the batch reached 285°F.

The polypropylene component of Stock 2 was added to the Banbury which was preheated by circulating steam through the rotors and jacket of the mixer. The polypropylene was subjected to shear for 2 minutes, whereupon the Banbury was stopped and the rest of the ingredients were added and the batch was blended until the temperature of the stock reached 380°–390°F.

At the end of the initial mixing cycle each stock was allowed to cool.

Stocks 1 and 2 were then blended together in various amounts on a mixing mill at 340°F, in the proportion shown in Tables 3–6.

| Table 3 Stock 3 | | Table 4 Stock 4 | |
|---|---|---|---|
| Compound 3 | Parts | Compound 4 | Parts |
| Stock 1 | 202.4 | Stock 1 | 188.9 |
| Hexa-5-Methanol (3,7)dioxibicyclo (3,3,0) octane* | 1.25 | Stock 2 | 18.5 |
| N-tert butyl-2-benzothiazole sulfenamide* | 0.90 | Hexa-5-Methanol (3,7)dioxibicyclo (3,3,0) octane* | 1.25 |
| Accelerator* | 0.25 | N-tert butyl-2-benzothiazole sulfenamide* | 0.90 |
| Sulfur* | 3.25 | Accelerator* | 0.25 |
| | | Sulfur* | 3.25 |
| Total | 208.05 | Total | 213.05 |

| Table 5 Stock 5 | | Table 6 Stock 6 | |
|---|---|---|---|
| Compound | Parts | Compound | Parts |
| Stock 1 | 175.4 | Stock 1 | 161.9 |
| Stock 2 | 37.0 | Stock 2 | 55.5 |
| Hexa-5-Methanol (3,7)dioxibicyclo (3,3,0) octane* | 1.25 | Hexa-5-Methanol (3,7)dioxibicyclo (3,3,0) octane* | 1.25 |
| N-tert butyl-2-benzothiazole sulfenamide* | 0.90 | N-tert butyl-2-benzothiazole sulfenamide* | 0.90 |
| Accelerator* | 0.25 | Accelerator* | 0.25 |
| Sulfur* | 3.25 | Sulfur* | 3.25 |
| Total | 218.05 | Total | 223.05 |

*These compounds were added to the stock after blending and cooling of the other materials listed in the tables.

| Table 1 Stock 1 | | Table 2 Stock 2 | |
|---|---|---|---|
| Compound | Parts | Compound | Parts |
| Natural Rubber | 22 | Natural Rubber | 22 |
| Cis-polybutadiene | 28 | Cis-polybutadiene | 28 |
| poly(butadiene-co-styrene)[1] | 75 | poly(butadiene-co-styrene)[1] | 75 |
| Carbon Black | 57.5 | Carbon Black | 57.5 |
| Stearic Acid | 1 | Stearic Acid | 1 |
| Zinc Oxide | 5 | Zinc Oxide | 5 |
| Activators | 4 | Activators | 4 |
| Pine Tar | 7 | Pine Tar | 7 |
| Plasticizers | 2.9 | Plasticizers | 2.9 |
| | | Polypropylene | 75 |
| Total | 202.4 | | 277.4 |

[1]Contains 22–24% by wt. bound styrene.

In each case, the rubber was milled long enough to insure uniform distribution of materials throughout the batch. The blended stock were then removed from the mill and allowed to cool.

Each of the blended stocks was placed separately on a cold mill which was at no time permitted to exceed a temperature of 170°F. and the sulfur and accelerators noted in Tables 3–6 were added. The stocks were each cut back and forth about six times to insure thorough blending, sheeted off the mill, cooled and then cured after shaping and consolidation.

The cured stocks (carcass stocks) were subjected to testing conventionally as shown to determine the effect of the polypropylene on normal stock properties. The results are given in Table 7. The tensile strength and elongation were run on a Scott machine, and the modulus was run on an autographic stress-strain machine.

Table 7

| Test | Stock 3 | Stock 4 | Stock 5 | Stock 6 |
|---|---|---|---|---|
| Polypropylene % | 0 | 2.4 | 4.8 | 7.2 |
| ML-4 212°F. | 47 | 46 | 51 | 57 |
| Mooney Scorch (MS) | | | | |
| MS, Minimum | 20.0 | 18.0 | 16.0 | 18.0 |

Table 7-continued

| Test | Stock 3 | Stock 4 | Stock 5 | Stock 6 |
|---|---|---|---|---|
| 3 Pt. rise, Mins. | 28.6 | 30.5 | 31.8 | 32.0 |
| 23 Pt. rise, Mins. | 31.6 | 33.8 | 35.6 | 35.5 |
| Δ MS, Mins. | 3.0 | 3.3 | 3.8 | 3.5 |
| Cure, Mins, at 315°F. | 20 | 20 | 20 | 20 |
| Autographic: | | | | |
| S-200 Psi | 720 | 830 | 915 | 1050 |
| S-300 | 1280 | 1420 | 1500 | 1630 |
| Tensile Psi | 2050 | 1620 | 1875 | 2000 |
| $E_b\%$ | 440 | 335 | 370 | 370 |
| Durometer | 57 | 59 | 61 | 66 |
| Tear 250°F., ppli | 73 | 68 | 76 | 104 |
| Scott: | | | | |
| Tensile, RT | 2320 | 2480 | 2430 | 2450 |
| 250°F. | 800 | 963 | 963 | 1080 |
| $E_b\%$ RT | 430 | 410 | 390 | 350 |
| 250°F. | 240 | 290 | 280 | 300 |
| Goodrich Flex 212°F. | | | | |
| Static defl., % | 15.0 | 15.0 | 12.5 | 11.6 |
| 15 min. Temp. rise | 28 | 28 | 31 | 35 |
| Dynamic drift % | 0.3 | 0.8 | 1.4 | 2.0 |
| Perm set % | 3.0 | 3.4 | 3.4 | 4.0 |
| Torsional Hyst. R.T. | .195 | .205 | .209 | .233 |
| 280°F. | .088 | .083 | .091 | .099 |
| Bashore Rbd, R.T. | 48 | 47 | 46 | 41 |
| Flexcracking, kc. | 183.6 | 495.9 | 194.4 | 300.4 |
| Air permeability 86°F. | 3.77 | 3.18 | 3.25 | 2.74 |
| × 10⁻³ 140°F. | 11.9 | 10.1 | 10.5 | 9.1 |

This example shows that as the loading proportion of polypropylene is increased from zero to 7.2%, the viscosity (ML-4) increases from 47 to 57. The stock becomes a little less "scorchy" as shown by the increase in time for a 23 point rise from 31.6 to 35.5 minutes. When cured 20 minutes at 315°F., the stiffness of the compound increases with loading as shown by the increase in S-200 and S-300 and by the increase in durometer. The room temperature tensile strength is not greatly affected but the tensile at 250°F, increases some with loading. Energy loss on flexing increases with loading as shown by Goodrich Flexometer temperature rise, torsional hysteresis, and Bashore rebound. The effect of loading on flexcracking is mixed, while there is a slight reduction in air permeability.

EXAMPLE 2

The two masterbatch compositions described in Table 8 were mixed (separately) in a Banbury mixer.

Table 8

| Stock 7 | | Stock 8 | |
|---|---|---|---|
| Compound | Parts | Compound | Parts |
| Poly(butadiene-co-styrene)1500[1] | 13 | Poly(butadiene-co-styrene)1500[1] | 13 |
| Poly(butadiene-co-styrene)1712[1] | 85 | Poly(butadiene-co-styrene)1712[1] | 85 |
| Cis-polybutadiene | 25 | Cis-polybutadiene | 25 |
| Reclaim 655 | 65 | Reclaim 655 | 65 |
| Carbon Black | 60 | Carbon Black | 60 |
| Stearic Acid | 1.25 | Stearic Acid | 1.25 |
| Zinc Oxide | 3.50 | Zinc Oxide | 3.50 |
| ENSO 50 | 4.20 | ENSO 50 | 4.20 |
| Antiozonant | 1.50 | Antiozonant | 1.50 |
| | | Polypropylene | 75 |
| Total | 258.45 | Total | 333.45 |

[1]Contains 22–24% by wt. bound styrene.

The ingredients of Stock 7 were added to the Banbury and mixed until the temperature of the batch reached 280°F.

The polypropylene component of Stock 8 was added to the Banbury which was preheated by circulating steam through the rotors and jacket of the mixer. The polypropylene was subjected to shear for two minutes, whereupon the Banbury was stopped and the rest of the ingredients were added and the batch was blended until the temperature of the stock reached 360°–390°F.

At the end of the mixing cycle of Stocks 7 and 8 both were allowed to cool.

Stocks 7 and 8 were then blended together in various amounts on a mixing mill at 340°F. in the proportions shown in Tables 9–12.

| Table 9 Stock 9 | | Table 10 Stock 10 | |
|---|---|---|---|
| Compound | Parts | Compound | Parts |
| Stock 7 | 258.45 | Stock 7 | 240.95 |
| N-tert-butyl-2-benzo-thiazole-sulfenamide* | 0.70 | Stock 8 | 22.50 |
| Accelerator* | 0.10 | N-tert-butyl-2-benzo-thiazole-sulfenamide* | 0.70 |
| Sulfur* | 3.00 | Accelerator* | 0.10 |
| | | Sulfur* | 3.00 |
| Total | 262.25 | Total | 267.25 |

| Table 11 Stock 11 | | Table 11 Stock 12 | |
|---|---|---|---|
| Compound | Parts | Compound | Parts |
| Stock 7 | 223.45 | Stock 7 | 205.95 |

-continued

| Table 9 Stock 9 | | Table 10 Stock 10 | |
|---|---|---|---|
| Compound | Parts | Compound | Parts |
| Stock 8 | 45.0 | Stock 8 | 67.5 |
| N-tert-butyl-2-benzo-thiazole-sulfen-amide* | 0.70 | N-tert-butyl-2-benzo-thiazole-sulfen-amide* | 0.70 |
| Accelerator* | 0.10 | Accelerator* | 0.10 |
| Sulfur* | 3.0 | Sulfur* | 3.0 |
| Total | 272.25 | Total | 277.25 |

*These compounds were added to the stock after blending and cooling of the other materials in the table.

The rubber was milled long enough to insure uniform distribution of materials throughout the batch whereupon each of the blended stocks was removed from the mill and allowed to cool.

Each of the blends was placed separately on a cold mill which was at no time permitted to exceed 170°F. and the sulfur and accelerators noted in Tables 9–12 were added. The stocks were each cut back and forth about six times to insure thorough blending, sheeted off the mill, cooled and then cured after shaping and consolidation.

The cured stocks (sidewall stocks) were subjected to testing conventionally as shown to determine the effect of polypropylene on the normal stock properties. The results are given in Table 13. The tensile strength and elongation were run on a Scott machine, and the modulus was run on an autographic stress-strain machine.

Table 13

| Test | Stock 9 | Stock 10 | Stock 11 | Stock 12 |
|---|---|---|---|---|
| Polypropylene % | 0 | 1.9 | 3.8 | 5.7 |
| ML-4 212°F. | 59 | 57 | 65 | 73 |
| Mooney Scorch (MS) 270°F. | 23.9 | 23.6 | 26.2 | 29.2 |
| 3 Pt. rise, Mins. | 20.6 | 20.8 | 22.1 | 21.1 |
| 23 Pt. Rise, Mins. | 25.2 | 26.7 | 27.1 | 25.4 |
| Δ MS, Mins. | 4.6 | 5.9 | 5.0 | 4.3 |
| Cure, Mins., at 315°F. | 20 | 20 | 20 | 20 |
| Autographic: | | | | |
| S-200 Psi | 510 | 590 | 650 | 800 |
| S-300 | 900 | 970 | 1040 | 1200 |
| Tensile Psi | 1650 | 1580 | 1620 | 1470 |
| $E_b$% | 495 | 465 | 460 | 375 |
| Durometer | 51 | 54 | 56 | 61 |
| Tear 250°F., ppli | 78 | 88 | 66 | 67 |
| Scott: | | | | |
| Tensile, RT | 1660 | 1840 | 1850 | 1860 |
| 250°F. | 633 | 643 | 683 | 723 |
| $E_b$% RT | 420 | 450 | 430 | 390 |
| 250°F. | 280 | 290 | 280 | 280 |
| Goodrich Flex 212°F. | | | | |
| Static defl., % | 19.8 | 19.4 | 19.8 | 19.8 |
| 15 min. Temp. rise | 47 | 50 | 51 | 57 |
| Dynamic drift % | 4.3 | 5.6 | 7.1 | 10.6 |
| Perm set % | 10.0 | 10.8 | 12.2 | 13.8 |
| Torsional Hyst. R.T. | .282 | .293 | .331 | .346 |
| 280°F. | .112 | .152 | .119 | .129 |
| Bashore Rbd, R.T. | 43 | 42 | 40 | 37 |
| Flexcracking, kc. | 551 | 775 | 523 | 360 |
| Air Permeability $\times 10^{-8}$) 86°F. | 2.38 | 2.02 | 2.13 | 1.85 |
| 140°F. | 9.24 | 8.20 | 8.49 | 7.49 |

The results, when examined as a function of loading of polypropylene, show much the same trends as disclosed by Table 7, namely an increase in stiffness, an increase in tensile, and an increase in energy loss on flexing. Air permeability is again reduced.

EXAMPLE 3

The two masterbatch compositions described in Table 14 were mixed (separately) in a Banbury mixer.

Table 14

| Stock 13 | | Stock 14 | |
|---|---|---|---|
| Compound | Parts | Compound | Parts |
| Poly(butadiene-co-styrene)8202[1] | 105 | Poly(butadiene-co-styrene)8202[1] | 105 |
| Cis-polybutadiene | 30 | Cis-polybutadiene | 30 |
| Carbon Black | 70 | Carbon Black | 70 |
| Zinc Oxide | 3 | Zinc Oxide | 3 |
| Stearic Acid | 1.0 | Stearic Acid | 1.0 |
| ENSO 50 | 2.0 | ENSO 50 | 2.0 |
| Antiozonant | 0.5 | Antiozonant | 0.5 |
| Sundex 790 | 7 | Sundex 790 | 7 |
| | | Polypropylene | 75 |
| Total | 218.5 | Total | 293.5 |

[1] Contains 22–24% by wt. bound styrene.

The ingredients of Stock 13 were added to the Banbury and mixed until the temperature of the batch reached 300°–310°F.

The polypropylene component of Stock 14 was added to the Banbury which was preheated by circulating steam through the rotors and jacket of the mixer. The polypropylene was subjected to shear for 2 minutes, whereupon mixing was stopped and the rest of the ingredients were added and the resultant batch was blended until the temperature of the stock reached 360°–390°F.

At the end of the mixing cycle, Stocks 13 and 14 were allowed to cool.

Stocks 13 and 14 were then blended together in various amounts on a mixing mill at 300°F. in the proportions shown in Tables 15–18.

| Table 15 | Table 16 |
|----------|----------|
| Stock 15 | Stock 16 |

| Compound | Parts | Compound | Parts |
|----------|-------|----------|-------|
| Stock 13 | 218.5 | Stock 13 | 203.9 |
| Accelerator* | 1.3 | Stock 14 | 19.6 |
| Sulfur* | 1.75 | Accelerator* | 1.3 |
|  |  | Sulfur* | 3.25 |
| Total | 221.35 | Total | 226.55 |

| Table 17 | Table 18 |
|----------|----------|
| Stock 17 | Stock 18 |

| Compound | Parts | Compound | Parts |
|----------|-------|----------|-------|
| Stock 13 | 189.4 | Stock 13 | 174.8 |
| Stock 14 | 39.1 | Stock 14 | 58.7 |
| Accelerator* | 1.3 | Accelerator* | 1.3 |
| Sulfur* | 1.75 | Sulfur* | 1.75 |
| Total | 231.55 | Total | 236.55 |

*These compounds were added to the stock after blending and cooling of the other materials in the table.

The rubber was milled long enough to insure uniform distribution of materials throughout the batch whereupon each of the blended stocks was removed from the mill and allowed to cool.

The blended stocks were placed separately on a mill maintained below 170°F. and the sulfur and accelerators noted in Tables 15–18 were added. A separate batch of stock 14 used in stock 18B was prepared using polypropylene in fine powder form instead of the pellet form used in stocks 1-18A. Every precaution was taken to keep this well below the softening temperature of polypropylene at all stages of processing: masterbatching, blending and accelerator addition. The stocks were each cut back and forth about six times to insure thorough blending. A shaped and consolidated article was formed from the stock which was then cured. The cured stocks (tread stocks) were subjected to testing conventionally as shown to determine the effect of polypropylene on the normal stock properties. The results are given in Table 19. The tensile strength and elongation were run on a Scott machine, and the modulus was run on an autographic stress-strain machine.

Table 19

| Test | Stock 15 | Stock 16 | Stock 17 | Stock 18 $A^1$ | Stock 18 $B^2$ |
|------|----------|----------|----------|----------|----------|
| Polypropylene % | 0 | 2.1 | 4.2 | 6.3 | 6.3 |
| ML-4 212°F. | 62 | 67 | 77 | 104 | — |
| Mooney Scorch (MS) 270°F. | | | | | |
| MS, Minimum | 25.7 | 27.9 | 29.8 | 35.6 | — |
| 3 Pt. rise, Mins. | 19.9 | 19.1 | 18.5 | 19.8 | — |
| 23 Pt. rise, Mins. | 24.2 | 22.8 | 22.6 | 23.0 | — |
| MS, Mins. | 4.3 | 3.7 | 4.1 | 3.2 | — |
| Cure, Mins. at 315°F | 15 | 15 | 15 | 15 | 15 |
| Autographic: | | | | | |
| S-200 Psi | 480 | 770 | 920 | 1090 | 480 |
| S-300 | 950 | 1230 | 1400 | 1560 | 930 |
| Tensile Psi | 1810 | 1730 | 1750 | 1780 | 1540 |
| $E_b$% | 475 | 410 | 375 | 350 | 435 |
| Durometer | | | | | |
| Tear 250°F., ppli | 116 | 199 | 194 | 205 | 78 |
| Scott: | | | | | |
| Tensile, RT | 2080 | 2170 | 1960 | 2160 | 1780 |
| 250°F. | 877 | 1030 | 993 | 1020 | 647 |
| $E_b$% | 420 | 390 | 320 | 330 | 420 |
| 250°F. | 310 | 300 | 300 | 300 | 270 |
| Goodrich Flex 212°F. | | | | | |
| Static defl., % | 16.1 | 16.7 | 16.2 | 13.5 | — |
| 15 min. temp. rise | 48 | 58 | 60 | 63 | — |
| Dynamic drift % | 3.0 | 5.0 | 9.0 | 9.4 | — |
| Perm set % | 8.0 | 9.5 | 11.8 | 10.3 | — |
| Torsional Hyst, R.T. | 0.402 | 0.472 | 0.473 | 0.483 | 0.425 |
| 280°F. | 0.149 | 0.169 | 0.199 | 0.195 | 0.151 |
| Bashore Rbd, R.T. | 36 | 35 | 32 | 31 | — |
| Flexcracking | 858 | 387 | 226 | 93 | — |
| Air Permeability 86°F. | 3.04 | 2.54 | 2.69 | 2.38 | — |
| (× 10-3) 140°F. | 9.90 | 8.54 | 9.07 | 8.29 | — |

$A^1$-represents a blend wherein polypropylene was added in the same pellet form used in stocks 1 through 18A.
$B^2$-represents a blend wherein polypropylene powder was cold milled into the composition.

The results considered as a function of polypropylene loading are in general a repetition of the trends found in Tables 7 and 13, an exception being the great improvement in hot tear strength as the loading increases.

EXAMPLE 4

This example discloses the preparation of blends of various rubbers and polypropylene resin.

The compositions set forth in Tables 20–24 were blended in a Banbury mixer.

Table 20

| Stock 19 (Footwear composition) | |
|---|---|
| Compound | Parts |
| Poly (butadiene-co-styrene) 8140[1] | 100.00 |
| Hydrated silica 215 | 34.14 |
| Chlorinated Paraffin Oil | 43.90 |
| R-202 | 8.30 |
| Polyethylene glycol 4000 | 4.21 |
| Hydrated sodium silica aluminate | 3.38 |
| S.W. Crystals | 0.27 |
| Hydrocarbons (65% straight chain and 35% branched chains) | 0.31 |
| Zinc Oxide | 1.01 |
| Total | 194.52 |

[1]Contains 22% by weight bound styrene.

Table 21

Stock 20 (Red Sheet composition)

| Compound | Parts |
|---|---|
| Poly(butadiene-co-styrene) 1713[1] | 21.89 |
| Zinc Oxide | 0.66 |
| Magnesium carbonate | 1.46 |
| Clay | 33.56 |
| Natural calcium carbonate | 35.02 |
| Red Oxide | 1.46 |
| Paraffin petroleum oil | 1.46 |
| Unsaturated hydrocarbon polymers | 1.17 |
| Plasticizer-9 | 0.58 |
| Tycol albawax 23 | 0.22 |
| Polyethylene glycols 4000 | 0.15 |
| Stearic acid | 0.22 |
| Alkylated bis phenol | 0.22 |
| Polyethylene AC-617 | 0.73 |
| Total | 98.80 |

[1]Contains 22% by wt. bound styrene.

Table 22

Stock 21 (EPDM)

| Compound | Parts |
|---|---|
| Ethylene-propylene-diene Terpolymer 502 | 100.0 |
| Carbon black HA2 | 50.00 |
| Naphthenic oil | 15.00 |
| Zinc Oxide | 5.00 |
| Stearic acid | 1.00 |
| Total | 171.00 |

Table 23

Stock 22 (Neoprene)

| Compound | Parts |
|---|---|
| Polychloroprene (WHV) | 6.40 |
| Poly(butadiene-co-styrene) 1808[1] | 22.86 |
| Zinc Oxide | 1.01 |
| Magnesium oxide | 0.37 |
| Chloroprene M-40 | 9.14 |
| Natural calcium carbonate | 33.83 |
| Carbon black SRF | 9.14 |
| Plasticizer RT-3 | 0.29 |
| Vulcanized vegetable oil | 4.57 |
| Aromatic oil-silicate blend | 9.14 |
| Plasticizer ZO-9 | 0.73 |
| Tycol Albawax 23 | 0.24 |
| Stearic Acid | 0.16 |
| Polyethylene AC-617 | 1.10 |
| Total | 98.98 |

[1]Contains 22-24% by wt. bound styrene.

Table 24

Stock 23 (Butyl Rubber)

| Compound | Parts |
|---|---|
| Poly(Isobutylene-co-Isoprene)[1] | 56.82 |
| Magnesium oxide | 0.57 |
| Zinc oxide | 1.70 |
| Carbon black FEA | 17.05 |
| Carbon black HAF | 17.05 |
| Paraffinic oil | 2.84 |
| Petrolatum-silicate blend | 0.57 |
| Stearic acid | 0.57 |
| Paraffin wax | 0.57 |
| Total | 98.31 |

[1](1.1–1.7 mole % isoprene)

Table 25

| | Stock 24 | Stock 25 | Stock 26 | Stock 27 | Stock 28 |
|---|---|---|---|---|---|
| Polypropylene | 100 | 100 | 100 | 80 | 100 |
| Ionomer (Surlyn A) | | | | 20 | |
| Stock 19 | 300 | | | | |
| Stock 20 | | 300 | | | |
| Stock 21 | | | 300 | | |
| Stock 22 | | | | 300 | |
| Stock 23 | | | | | 300 |
| Total in Parts | 400 | 400 | 400 | 400 | 400 |

Stocks 19–23 were prepared separately by adding the ingredients listed into a Banbury internal shear mixer and mixing until the temperature of the batch was approximately 250°F.

A masterbatch blend was then prepared by adding the polypropylene component of Stocks 24 through 28 (See Table 25 above) in each instance initially to a Banbury mixer which was preheated by circulating steam through rotors and jacket of the mixer. The polypropylene was subjeced to shear for two minutes whereupon, the Banbury was stopped and the other components listed were added and the batches were each blended until the temperatures of the stock in each case reached about 380°F.

Each masterbatch of stocks 24–28 were then separately blended with the appropriate stock 19–23 (as listed in Tables 16–30) on a mixing mill at 330°F. to obtain a composition having between 2 and 25% polypropylene based on total weight.

Accelerators and sulfur were added to the appropriate stocks at 150°F. in a Banbury to form the compositions shown in Tables 26–31.

Table 26

Stocks 29 and 30

| Compound | Parts Stock 29 | Stock 30 |
|---|---|---|
| Stock 19 | 194.52 | 162.10 |
| Stock 24 | | 32.42 |
| N-t-butyl-2-benzothiazole sulfenamide | 1.06 | 1.06 |
| Di-penta-methylene-thiuramhexasulfide | 0.33 | 0.33 |
| Zinc dimethyl dithiocarbamate | 1.13 | 1.13 |
| Sulfur | 3.58 | 3.58 |
| Total | 200.62 | 200.62 |

Table 27

Stocks 31 and 32

| Compound | Parts Stock 31 | Stock 32 |
|---|---|---|
| Stock 20 | 98.80 | 69.04 |
| Stock 25 | | 19.76 |
| Di-ortho-tolylguanidine | 0.10 | 0.10 |
| N-cyclohexyl-2-benzothiazole sulfenamide | 0.32 | 0.32 |
| Sulfur | 0.80 | 0.80 |
| Total | 100.02 | 100.02 |

Table 28

Stocks 33 and 34

| Compound | Parts Stock 33 | Stock 34 |
|---|---|---|
| Stock 21 | 171.00 | 136.60 |
| Stock 26 | — | 34.20 |
| Tetramethylthiuram monosulfide | 0.50 | 0.50 |
| 2-Mercaptobenzothiazole | 1.50 | 1.50 |
| Sulfur | 1.50 | 1.50 |
| Total | 174.50 | 174.30 |

Table 29

Stocks 35 and 36

| Compound | Parts Stock 35 | Stock 36 |
|---|---|---|
| Stock 22 | 98.98 | 79.18 |
| Stock 27 | — | 19.80 |
| Tetramethylthiuram monosulfide | .22 | 0.22 |
| Di-orthotolylguanidine | .20 | 0.20 |
| Sulfur | .59 | 0.59 |
| Total | 99.99 | 99.99 |

Table 30

Stocks 37 and 38

| Compound | Parts Stock 37 | Stock 38 |
|---|---|---|
| Stock 23 | 98.31 | 68.65 |
| Stock 28 | — | 19.66 |
| Benzothiazyl disulfide | 1.14 | 1.14 |
| Tetramethylthiuram disulfide | .57 | .57 |
| Total | 100.02 | 100.02 |

Various amounts of Surlyn A (1555) (an ionomer consisting of ethylene and the partial sodium salt of methacrylic acid) were blended with the blend of stocks 19 and 24 on a mixing mill at 300°F. to form the compositions shown in Table 31. Then the accelerators and sulfur were added to these mixed compounds at 150°F. to form the compositions shown in Tables 26–31.

In each case the compound is milled long enough to insure uniform distribution of materials throughout the batch. The blends, forming stocks 29–43, are then removed from the mill and allowed to cool.

Table 31

|  | Stock 39 | Stock 40 | Stock 41 | Stock 42 | Stock 43 |
|---|---|---|---|---|---|
| Stock 19 | 162.10 | 162.10 | 162.10 | 162.10 | 162.10 |
| Stock 24 | 32.42 | 32.42 | 32.42 | 32.42 | 32.42 |
| Surlyn A (1555) | 2.00 | 4.00 | 6.00 | 8.00 | 10.00 |
| N-t-Butyl-2-benzo-thiazole sulfinamide | 1.06 | 1.06 | 1.06 | 1.06 | 1.06 |
| D-pentamethylene thiuramhexasulfide | 0.33 | 0.33 | 0.33 | 0.33 | 0.33 |
| Zinc dimethyldi-chlorocarbamate | 1.33 | 1.33 | 1.33 | 1.33 | 1.33 |
| Sulfur | 3.58 | 3.58 | 3.58 | 3.58 | 3.58 |
| Total | 202.82 | 204.82 | 206.82 | 208.82 | 210.82 |

EXAMPLE 5

Each stock set forth in Table 32 was pressed at 212°F. into a disc measuring 2 inches in diameter by ¼ inch in thickness. The densities of the uncured compounds and the compounds cured in a standard oven without pressure were measured precisely, in order to determine the degree of blow. The compounds were cured in the oven using a standard cure cycle at 310°F.

The relative values of the increase or the decrease in density are computed on the basis of the density of the uncured stocks. A compound which has a 3 percent change or less in density is considered to be a no blow compound. The results are given in Table 32.

TABLE 32

RESULTS OF DENSITY MEASUREMENT

| Stock | Blend | Density ($\rho_a$ g/cc) of Uncured Composition | Density ($\rho_b$ g/cc) of Cured Composition | $\frac{\rho_b - \rho_a}{\rho_a} \times 100$ (%) |
|---|---|---|---|---|
| Stock 3 |  | 1.1219 | 1.0659 | −4.99 |
| Stock 4 | (Carcass + PP[1]) | 1.1283 | 1.0967 | −2.87 |
| Stock 5 | (Carcass + PP) | 1.1292 | 1.0991 | −2.66 |
| Stock 6 | (Carcass + PP) | 1.1219 | 1.1135 | −0.75 |
| Stock 9 | (Sidewall) | 1.1422 | 1.0281 | −9.98 |
| Stock 11 | (Sidewall + pp) | 1.1352 | 1.0985 | −3.00 |
| Stock 12 | (Sidewall + PP) | 1.1226 | 1.1041 | −1.65 |
| Stock 15 | (Tread) | 1.1170 | 1.0710 | −4.13 |
| Stock 17 | (Tread + PP) | 1.1340 | 1.1290 | −0.37 |
| Stock 18 | (Tread + PP) | 1.1030 | 1.1350 | +2.90 |
| Stock 29 | (Footwear) | 1.0755 | 0.7793 | −27.55 |
| Stock 30 | (Footwear + PP) | 1.0675 | 1.0439 | −2.21 |
| Stock 31 | (Red Sheet) | 1.6480 | 1.4831 | −10.00 |
| Stock 32 | (Red Sheet + PP + SA) | 1.6489 | 1.5835 | −3.00 |
| Stock 33 | (EPDM) | 1.0561 | 0.7299 | −30.88 |
| Stock 34 | (EPDM + PP) | 1.0376 | 1.0220 | −1.50 |
| Stock 35 | (Neoprene) | 1.3374 | 1.1304 | −15.50 |
| Stock 36 | (Neoprene + PP + SA) | 1.4208 | 1.4118 | −0.63 |
| Stock 37 | (Butyl) | 1.1178 | 0.8574 | −23.34 |
| Stock 38 | (Butyl + PP) | 1.1033 | 1.0748 | −2.58 |

TABLE 32-continued
RESULTS OF DENSITY MEASUREMENT

| Stock | Blend | Density ($\rho_a$g/cc) of Uncured Composition | Density ($\rho_b$g/cc) of Cured Composition | $\frac{\rho_b - \rho_a}{\rho_a} \times 100$ (%) |
|---|---|---|---|---|
| Stock 39 | (Footwear + PP + SA) | 1.0721 | 1.0727 | +0.06 |
| Stock 40 | (Footwear + PP + SA) | 1.0692 | 1.0675 | −0.17 |
| Stock 41 | (Footwear + PP + SA) | 1.0674 | 1.0699 | +0.23 |
| Stock 42 | (Footwear + PP + SA) | 1.0673 | 1.0691 | +0.17 |
| Stock 43 | (Footwear + PP + SA) | 1.0650 | 1.0695 | +0.42 |

PP represents polypropylene.
*SA represents ionomer of ethylene and half salt of methacrylic acid.
NOTE:
A (−) denotes that density of cured article decreased by the amount given and a (+) denotes that density of the cured article increased by the amount given.

This Example shows that rubber compounds prepared as disclosed herein and which have been modified in accordance with the present invention free cure in an oven without pressure. The problem of blowing is virtually eliminated.

EXAMPLE 6

The tensile strength of each of the stocks 29–32 indicated in Table 33 was measured to determine the extent of blowing. Each of the stocks as prepared herein were cured at 310°F. in a hot air oven using a pressure system (i.e., a standard press cure in a platen) for some of the samples, and using a free cure system without pressure for the other samples.) The tensile strengths and elongations of the stocks cured using both systems were run on a Scott machine. The tensile strength of the stocks which were cured without pressure decreased sharply, while the change in tensile strength of no blow stock is insignificant. The results are given in Table 33.

Table 33

1. Pressure Cure — Tensile Strength and Elongation

| | Tensile Strength (Psi) | Elongation |
|---|---|---|
| Stock 29 (Footwear) | 650 | 360 |
| Stock 30 (Footwear + PP) | 887 | 300 |
| Stock 31 (Red sheet) | 493 | 260 |
| Stock 32 (Red sheet + PP) | 680 | 110 |

2. Oven Cure Without Pressure

| | Tensile Strength (Psi) | Elongation |
|---|---|---|
| Stock 29 (Footwear) | 570 | 360 |
| Stock 30 (Footwear + PP) | 810 | 280 |
| Stock 31 (Red sheet) | 197 | 250 |
| Stock 32 (Red sheet + PP) | 577 | 100 |

PP represents polypropylene

EXAMPLE 7

The blowing temperature of a rubber compound blend of rubber plus resin can be determined by microwave cure. The small disc samples were placed in a microwave oven having a nominal power output of 1 kilowatt R.F. energy at 2,450 megacycles. The resonant cavity is 12 × 12 × 6 inches. Energy is supplied until the stocks blow and burn. The temperatures after blowing and burning have been measured with the sensitive thermocouples. The results of curing stocks 15, 18, 37 and 38 in the microwave oven are shown in Table 34.

Table 34
Results of Microwave Cure

| | Blow Temp. °F. | Burn Temp. °F. |
|---|---|---|
| Stock 15 (Tread) | 290 | 420 |
| Stock 18 (Tread + PP) | 380 | 500 |
| Stock 37 (Butyl) | 270 | 370 |
| Stock 38 (Butyl + PP) | 364 | 450 |

PP represents polypropylene.

This example shows that the addition of the resin to the rubber in accordance with the present invention raises the temperature at which the stock blows, and in addition, the temperature at which the stock burns.

Through the use of the present invention it is possible to preheat by microwave energy a rubber-resin stock approximately 100°F. higher before blow occurs. As a result cure time is markedly reduced.

Figure 2:
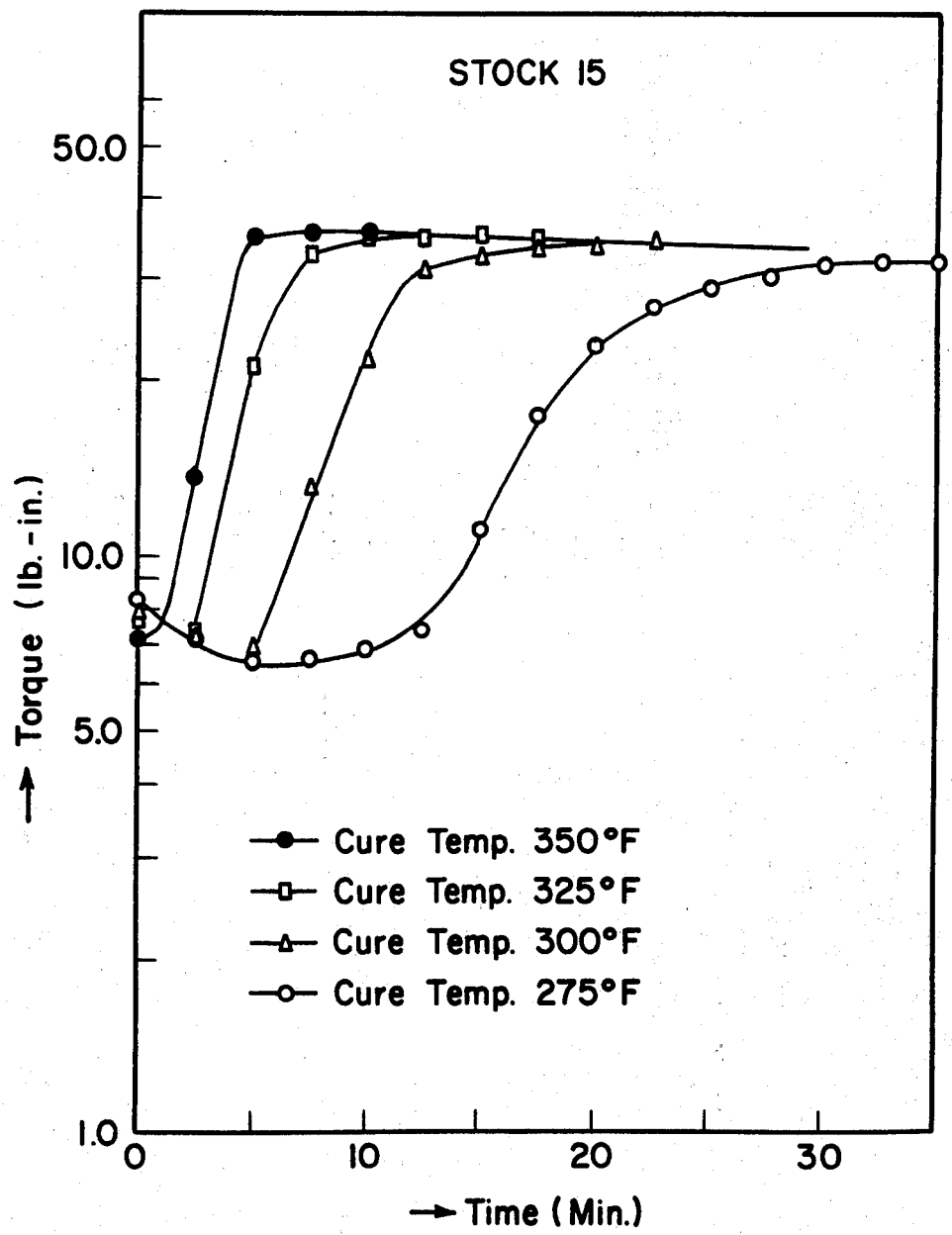
Figure 3:
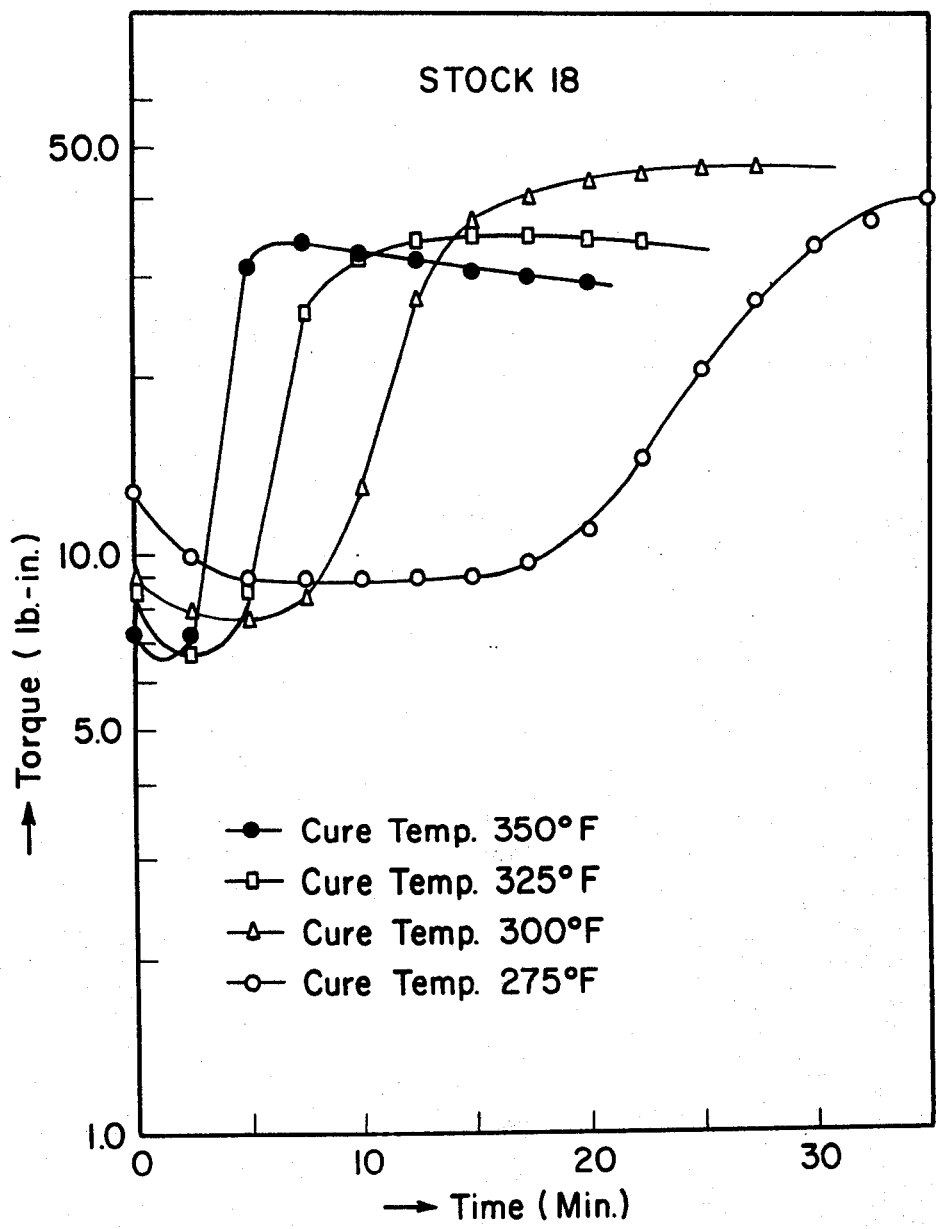

The cure rates of stocks 13 and 18 at 275, 300, 325° and 350°F. were examined by obtaining Monsanto Rheometer curves which are shown in FIGS. 2–3. It can be seen that in each instance the induction time for curing is markedly reduced.

EXAMPLE 8

Polyethylene and polypropylene were separately incorporated into a styrene-butadiene rubber along with other ingredients on a roll mill which is maintained at a temperature of 330°F.

Sulfur and N-cyclohexyl-2-benzothiazylsulfenamide are added at 150°F.

| Compound | Stock 44 Parts | Stock 45 Parts | Stock 46 Parts |
|---|---|---|---|
| SBR 1500[1] | 100 | 100 | 100 |
| Polyethylene | | 30 | |
| Polypropylene | | | 30 |
| Zinc oxide | 3 | 3 | 3 |
| Stearic Acid | 2 | 2 | 2 |
| Flexamine | 1 | 1 | 1 |
| Sulfur | 1.75 | 1.75 | 1.75 |
| Santocure | 1.5 | 1.5 | 1.5 |

[1](70/30 butadiene/styrene copolymer having a Mooney value ML-4 of about 52)

Stocks 44 and 45 were cured 30 minutes at 307°F. and stock 46 was cured at 300°F. in a hot air oven. The change in density of each stock before and after cure was measured to determine the extent of blow. The results are as follows:

| | Uncured Density $\rho_a$(g/cc) | Cured Density $\rho_b$(g/cc) | $\frac{\rho_a - \rho_b}{(A)} \times 100$ (%) |
|---|---|---|---|
| Stock 44 | 0.7890 | 0.7305 | −7.30 |
| Stock 45 | 0.8249 | 0.7775 | −5.76 |
| Stock 46 | 0.8376 | 0.82073 | −0.36 |

This example illustrates the unexpected result achieved by the use of polypropylene blended with rubber. An unmodified rubber and one containing polyethylene blended therein have a significant amount of blow compared with the rubber-polypropylene blend.

EXAMPLE 9

This example discloses the fabrication of a rubber-resin blend into a belt which is free cured.

The ingredients of stock 47 were added to a Banbury and blended until the temperature of the batch 250°F. approximately.

The polypropylene and Surlyn A components of stock 48 were added to a Banbury which was preheated by steam, followed by subsequently mixing in the remaining ingredients and blending until the temperature of the batch reached 375°F.

Stock 47 was then blended with stock 48 on a mixing mill at 330°F. Also, stock 47 was milled at 330°F. before mixing with accelerators and sulfur. The curatives shown in Table 35 were added to these mixed compounds at 200°F.

Table 34 shows the components of stocks 47 and 48.

Table 34

| Compound | Parts Stock 47 | Stock 48 |
|---|---|---|
| Poly(butadiene-co-styrene) 8454 | 52.86 | 52.86 |
| Poly(butadiene-co-styrene) 1606 | 36.89 | 36.89 |
| Zinc Oxide | 2.25 | 2.25 |
| Chlorinated paraffin | 2.25 | 2.25 |
| Antisun wax | 1.03 | 1.03 |
| Stearic acid | .72 | .72 |
| N-Isopropyl-N'-phenyl-p-phenylene diamine | .81 | .81 |
| Thermoflex A | .47 | .47 |
| Plasticizer | .90 | .90 |
| Polypropylene | | 27.32 |
| Surlyn A (1555) | | 5.45 |
| Total | 98.18 | 130.95 |

Table 35

| | Stock 49 | Stock 50 |
|---|---|---|
| Stock 47 | 98.18 | 81.75 |
| Stock 48 | | 16.33 |
| N-cyclohexyl-2-benzothiazole-sulfenamide | .67 | .67 |
| Bismuth dimethyl-dithiocarbonate | .16 | .16 |

Table 35-continued

| | Stock 49 | Stock 50 |
|---|---|---|
| Accelerator | .16 | .16 |
| Sulfur | .83 | .83 |
| Total | 100.00 | 100.00 |

The stocks were free cured in hot air oven using the standard sycle, and subsequently density measurements of the two stocks were taken. The results are given in Table 36.

Table 36

Determination of Extent of Blow by Measuring Density

| | Uncured Stock $\rho_a$(g/cc) | Cured Stock $\rho_b$(g/cc) | $\frac{\rho_a - \rho_b}{\rho_a} \times 100$(%) |
|---|---|---|---|
| Stock 49 | 1.1458 | 1.0066 | −12.03 |
| Stock 50 | 1.1331 | 1.1157 | −1.53 |

The physical properties of the stocks were measured. Table 37 gives the results of said measurements.

Table 37

Physical Properties of Stocks 49–50

| Stock | Elongation % | Tensile Strength (psi) | Tear Strength (Die C) (psi) | Durometer | Adhesion (lbs./in.) |
|---|---|---|---|---|---|
| Stock 49 | 300 | 1570 | 185 | 60 | 47–64 |
| | 400 | 2240 | | | |
| Stock 50 | 300 | 1910 | 192 | 67 | 50–48 |
| | 400 | 2520 | | | |

Stocks 49 and 50 were pressed with nylon fabrics treated with SBR-vinylpyridine latex at 250°F. for 4 minutes and cured completely in an oven (300°–320°F.) without pressure. Stock 50 did not blow, while stock 49 did blow. In order to obtain no blow belts with stock 49 more than 20 minutes press is required at 300°F. The result of adhesion of stock 50 was as good (more than 50 psi) as normally press cured belting.

EXAMPLE 10

Polypropylene was initially added to polybutadiene at 340°F. using masterbatch blending technique at a ratio of 1 to 3. The masterbatch compound was blended subsequently with polybutadiene at 270°F. in the amounts indicated. The filters, accelerators and curatives were added at 200°F. The compositons (in parts) are set forth in Table 38:

Table 38

| Compound | Stock 51 | Stock 52 | Stock 53 |
|---|---|---|---|
| Polybutadiene | 100 | 100 | 83.33 |
| Polypropylene | 33.3 | | |
| Stock 51 | | | 16.67 |
| Precipitated hydrated silica | | 38 | 38 |
| Polyethylene | | 20 | 20 |
| Titanox | | 4 | 4 |
| Barytes | | 8 | 8 |
| Dicumyl peroxide | | 2.75 | 2.75 |
| Trimethylolpropane trimethacrylate | | 20 | 20 |

The compositions of stocks 52 and 53 were injected into a dimpled mold to form a golf ball. The balls were cured in a hot air oven. The physical properties of the ball are set forth in Table 39.

Table 39

| Test | Stock 52 | Stock 53 |
|---|---|---|
| Durometer | 92 | 93 |
| Tensile | 1740 psi | 2820 psi |
| Elongation | 170% | 160% |

EXAMPLE 11

One sample prepared from stock 53 was cured in the microwave oven described in Example 7. The time to cure was 5 minutes. Another sample was cured using a standard cure cycle in a hot air oven which took 25 minutes at 310°F.

In the foregoing examples the polypropylene used was either the type coded 5820 manufactured by Shell Chemical Co. having a melt flow index of 10–12, or the type coded 6723 manufactured by Hercules Chemical Co. having a melt flow index of 0.8–1.0.

EXAMPLE 12

This example discloses the critical necessity of maintaining the additive polymer in the form of particles having a cross sectional dimension not greater than one-half micron and a L/D ratio of 2 or greater.

In order to eliminate the complexities of production compounds, a simple 2 component system was employed for the purpose of this example.

A first compound labeled SWHR-3 was prepared by first placing standard Malaysian natural rubber on an oil heated mill, the roll surface temperature of which was maintained at 350°F. The natural rubber was milled for 5 minutes and subsequently cooled. Ten phr of polypropylene (Enjay Powder No. CD-481) which had been screened to include particles of less than 100 mircons, was added to the natural rubber and the mixture was blended for 5 minutes at a temperatre of 200° to 250°F.

A second compound (labeled SWHR-4) was prepared by milling a blend of natural rubber and 10 phr polypropylene (Enjay Powder No. CD-481, unscreened) for 5 minutes at 350°F. This blend was then cooled. Two circular discs from each of the aforesaid compounds were formed for testing. The discs were pressed for 3 minutes at a temperture between 200° and 230°F. The pressed density ($\rho_p$) of each of the samples was measured. The pressed sample was placed in an oven at a temperature between 320° and 330°F. for 10 minutes to simulate a free cure. The density ($\rho_c$) of the oven aged samples was then calculated. Table 40 lists the values measured and calculated in accordance with the foregoing procedure.

TABLE 40

| | Density SWHR-3 | Density SWHR-4 |
|---|---|---|
| Original ($\rho_p$) | 0.8728 | 0.8633 |
| After Heating ($\rho_c$) | 0.7304 | 0.8599 |
| % Decrease ($\frac{\rho_c - \rho_a}{\rho_p}$) | 16.31% | 0.39% |
| Appearance | Blow | No Blow |

After the above noted compounds had been measured for density ratings, they were analyzed by transmissional electron microscopy whereupon it was determined that the particles in the SWHR-4 sample possessed a cross sectional dimension not greater than one-half micron and an L/D ratio of 2 or greater. The particles in the SWHR-3 compound did not have such dimensions.

Table 40 demonstrates conclusively the necessity of having the additive polymer present at a certain critical size configuration in order to achieve the no blow effect. Although the polypropylene added to the SWHR-3 compound was screened to obtain a particle size less than 100 microns, the blending was performed at a temperature below the melting point of the resin so that consequently the polypropylene in the blend was not formed into particles having a cross sectional dimension not greater than one-half micron and an L/D ratio of 2 or greater. As a result the structure of SWHR-3 was a cellular or spongy appearance as opposed to the sample formed in accordance with the instant invention, i.e., SWHR-4 which has a continuous solid surface.

Having thus described our invention, what we claim and desire to protect by Letters Patent is:

1. A composition of matter comprising a blend of vulcanizable material in admixture with between about 2–10% by weight of a fiber forming, semi-crystalline, thermoplastic resin which possesses a melting point of 250°F. or greater, said resin being dispersed in said vulcanizable material in the form of particles having a cross sectional dimension (D) not greater than one-half micron and a length (L) to (D) ratio of 2 or greater.

2. The composition of matter defined in claim 1 wherein said vulcanizable material is selected from the group consisting of (a) diene polymers, (b) copolymer rubbers, (c) natural rubber, (d) depolymerized rubber and (e) interpolymers of at least 2 alpha monoolefins and at least one copolymerizable diene.

3. The composition of matter defined in claim 1 wherein said resin is selected from the group consisting of (a) polyolefins having 3–5 carbon atoms, (b) intra- and extra-linear polyamides, (c) polyester condensate products of dihydric alcohols and organo-dibasic acids, (d) ionomers prepared by neutralizing with metal ions from Group I (a) and (b), Group II (a) and (b) or transition metals of the periodic table, at least 30% of the acid groups of a copolymer of units derived from an alpha olefin of the formula R—CH=CH$_2$, wherein R is a hydrogen of alkyl group having 1–8 carbon atoms and from 1.0 to 25 mole percent of units derived from an alpha-beta ethylenically unsaturated carboxylic acid.

4. The composition of matter defined in claim 3 wherein said vulcanizable material is selected from the group consisting of polybutadiene, polychloroprene, polyisoprene, copolymers of isobutylene and between about 0.25 and 10% of isoprene, balata, Hevea rubber and rubbery interpolymers of at least 2 alpha monoolefins having the formula CH$_2$=CHR in which R is hydrogen or a saturated alkyl hydrocarbon radical having from 1–8 carbon atoms, and at least one copolymerizable diene selected from the group consisting of dicyclopentadiene, methylcyclopentadiene dimer, 1-4 hexadiene, 11-ethyl-1, 11-tridecadiene-1, 9-octadiene-1, 5-cyclooctadiene.

5. The composition of matter defined in claim 4 wherein said resin is selected from the group consisting of polypropylene, poly 4-methylpentene-1, polyethylene terephthalate, a copolymer of 75–99% by weight of acrylic or methyacrylic acid wherein at least 30% of the acid groups have been neutralized with sodium, zinc or calcium metal ions.

* * * * *